United States Patent
Prasad et al.

(10) Patent No.: US 8,891,391 B2
(45) Date of Patent: Nov. 18, 2014

(54) RESOURCE ALLOCATION IN MIMO MULTI-CELLULAR NETWORKS VIA SUBMODULAR OPTIMIZATION

(75) Inventors: Narayan Prasad, Monmouth Junction, NJ (US); Honghai Zhang, Princeton, NJ (US); Luca Venturino, Princeton, NJ (US); Jubin Jose, Austin, TX (US); Sampath Rangarajan, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 328 days.

(21) Appl. No.: 13/459,058

(22) Filed: Apr. 27, 2012

(65) Prior Publication Data
US 2012/0275402 A1    Nov. 1, 2012

Related U.S. Application Data

(60) Provisional application No. 61/480,424, filed on Apr. 29, 2011.

(51) Int. Cl.
H04W 72/00 (2009.01)
H04L 5/00 (2006.01)
H04L 12/24 (2006.01)
H04W 72/04 (2009.01)
H04W 28/04 (2009.01)
H04W 72/08 (2009.01)

(52) U.S. Cl.
CPC ......... *H04W 72/0446* (2013.01); *H04L 5/0073* (2013.01); *H04W 28/048* (2013.01); *H04W 72/082* (2013.01); *H04L 5/0035* (2013.01)
USPC .......................................... 370/252; 370/329

(58) Field of Classification Search
None
See application file for complete search history.

(56) References Cited

U.S. PATENT DOCUMENTS

| | | |
|---|---|---|
| 2010/0130223 A1 | 5/2010 | Liao et al. |
| 2010/0197314 A1 | 8/2010 | Maaref et al. |
| 2011/0223949 A1* | 9/2011 | Lee et al. ...................... 455/501 |
| 2013/0315156 A1* | 11/2013 | Xiao et al. .................... 370/329 |

* cited by examiner

*Primary Examiner* — Marcus R Smith
(74) *Attorney, Agent, or Firm* — Joseph Kolodka (57) ABSTRACT

A method to allocate resources in a wireless MIMO system, by enforcing per-cell orthogonality to avoid intra-cell interference; and allocating resources based on interference handling.

18 Claims, 6 Drawing Sheets

RESOURCE ALLOCATION IN MIMO MULTI-CELLULAR NETWORKS VIA SUBMODULAR OPTIMIZATION

This application claims priority to Provisional Application Ser. No. 61/480,424 filed Apr. 29, 2011, the content of which is incorporated by reference.

BACKGROUND

The present invention relates to resource allocation in multi-cellular networks.

The exponentially increasing demand for data (particularly in the downlink) has ensured that future wireless cellular networks will be interference-limited. This necessitates a careful handling of inter-cell interference. Indeed substantial performance gains are possible if inter-cell interference is managed via coordinated resource allocation across multiple cells. Studies on coordinated processing assumed that both data and channel state information of all users are shared in real-time. However, in practice coordination is possible only on a per-cluster basis. Furthermore, the limited backhaul bandwidth essentially prevents real-time data sharing. Thus, it is reasonable to assume that each user can be served by only one base station. Nevertheless, downlink beam-vectors can still be optimized based on the inter-cell channel qualities and has been considered.

The application of linear transmit precoding over interference limited networks has been bolstered by recent degree-of-freedom (DoF) optimality results for interference alignment schemes (that involve linear precoding) for time-varying or frequency-selective interference channels. More importantly, realizing its benefits, fourth generation cellular standards such as LTE-A—CoMP: Coordinated Multi-Point TX/RX and IEEE 802.16m—Multi-BS MIMO have enabled coordinated linear transmit precoding among multiple cells albeit based on limited exchange of channel state information (CSI). Unfortunately, the optimal multi-cell linear precoding design problems are known to be hard even when perfect and global CSI is available. In particular, the weighted sum rate optimization problem even in the SISO interference channel with perfect CSI was shown to be NP hard. Consequently distributed and iterative algorithms that seek sub-optimal solutions have been proposed under both perfect CSI and imperfect CSI.

Practical resource allocation problems are inherently mixed optimization problems. This is because while the precoders can often be matrices with arbitrary complex-valued entries (subject to power constraints), most of the resources that have to be assigned to the users (such as frequency sub-carriers, modulations, among others) are discrete in nature. In order to handle the discrete aspect of our resource allocation problems we leverage sub-modular optimization techniques that can often provide a worst-case guarantee even when a low-complexity greedy algorithm is employed. We consider a cluster of cells communicating over multiple orthogonal slots in a coordinated fashion such that each user is associated with (and is served by) a particular cell and where intra-cell interference is avoided by ensuring users associated with the same cell are not simultaneously served on the same slot. In the following, we will use the terms user and mobile device interchangeably. Similarly the terms base station and source are also used interchangeably. Under this setup, we formulate and analyze three important versions of practical downlink multi-cell coordinated resource allocation under the following practical constraints that significantly reduce the signaling overhead and will be ubiquitous in the emerging 4G cellular networks.

The first constraint is that in any scheduling interval each scheduled user can be served using only one or at-most two distinct modulations. In practical systems, each modulation must be one out of 4, 16 or 64 QAM. On other hand powerful Turbo codes of several distinct coding rates are available. Hence it is reasonable to assume that for each QAM alphabet, ideal outer codes of a continuum of coding rates in are available. In addition to the above constraint, each scheduled user can be served using only one rank, i.e., the ranks of all the precoding matrices used to serve a particular user in a scheduling interval must be identical. Thus, while a different precoding matrix can be used to serve a particular user on each of its assigned slots, all these matrices must have a common rank. In certain systems with more stringent signaling overhead constraints, in any scheduling interval each scheduled user can be served by only one distinct precoding matrix drawn from a pre-defined finite codebook, over all slots assigned to that user.

SUMMARY

In one aspect, a system is disclosed that performs coordinated resource allocation among multiple cells in a cellular downlink. Three predetermined coordinated resource allocation problems are formulated as optimization problems that comply with certain predetermined constraints.

In another aspect, a method allocates resources in a wireless system to optimize communication between a set of sources and a plurality of mobile wireless devices over a plurality of orthogonal resource slots by: enforcing each source to transmit to at-most one device over each orthogonal slot; enforcing that the number of data streams transmitted by a source to a device is identical on all slots on which the said source transmits to the said device; and optimizing a metric responsive to the assignment of resource slots to mobile devices by each source in the set.

Advantages of the preferred embodiments may include one or more of the following. The system uses low complexity approximation methods that yield performance guarantees. These processes exploit the fact that either the original problems or some of their sub-problems can be recast as the maximization of a monotonic sub-modular function under a matroid constraint.

DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 1:
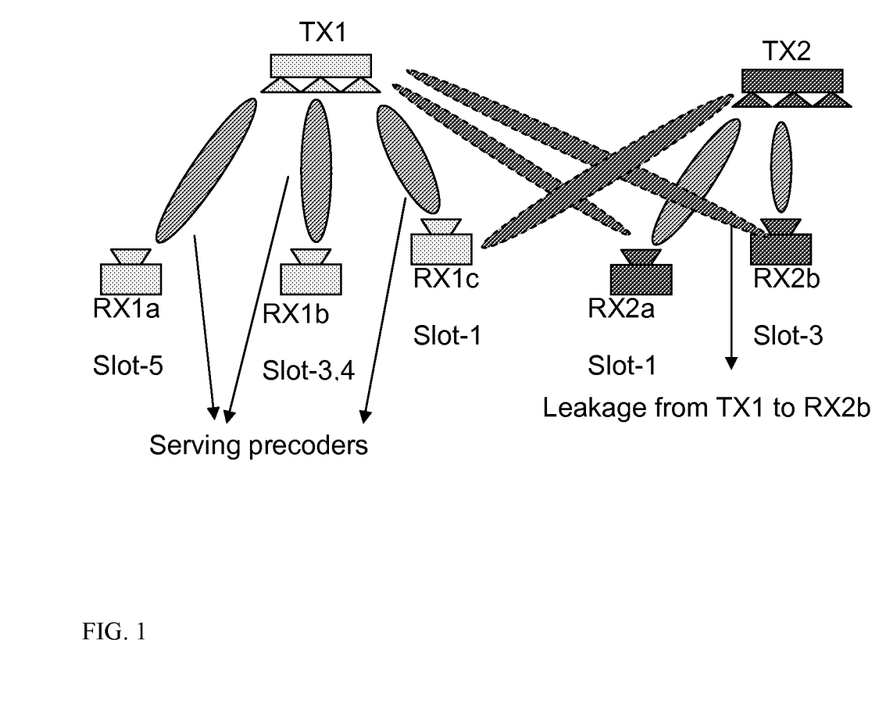
FIG. 1 shows an exemplary system for resource allocation in a multi-cellular downlink.

FIG. 1 shows an exemplary system for resource allocation in a multi-cellular downlink. In FIG. 1, multiple sources TX1 and TX2 can communicate with multiple intended receivers RX1a, RX1b, RX1c, RX2a, RX2b simultaneously on the same channel. This can lead to significant inter-cell interference and degrade throughput. On the other hand, allowing only one or a few sources to communicate may also be quite sub-optimal.

The system of FIG. 1 overcomes Interference and Limited Over-the-Air (OTA) Signaling before spectral efficiency gains can be realized. The OTA signaling problems include limited channel state information (CSI) feedback from users and constraints on scheduling flexibility. The system also handles complexity constraints on scheduling at the base stations. The system of FIG. 1 avoids intra-cell interference by enforcing per-cell orthogonality, i.e., each base-station (BS) only talks to at-most one user on each one of its multiple slots.

Figure 2:
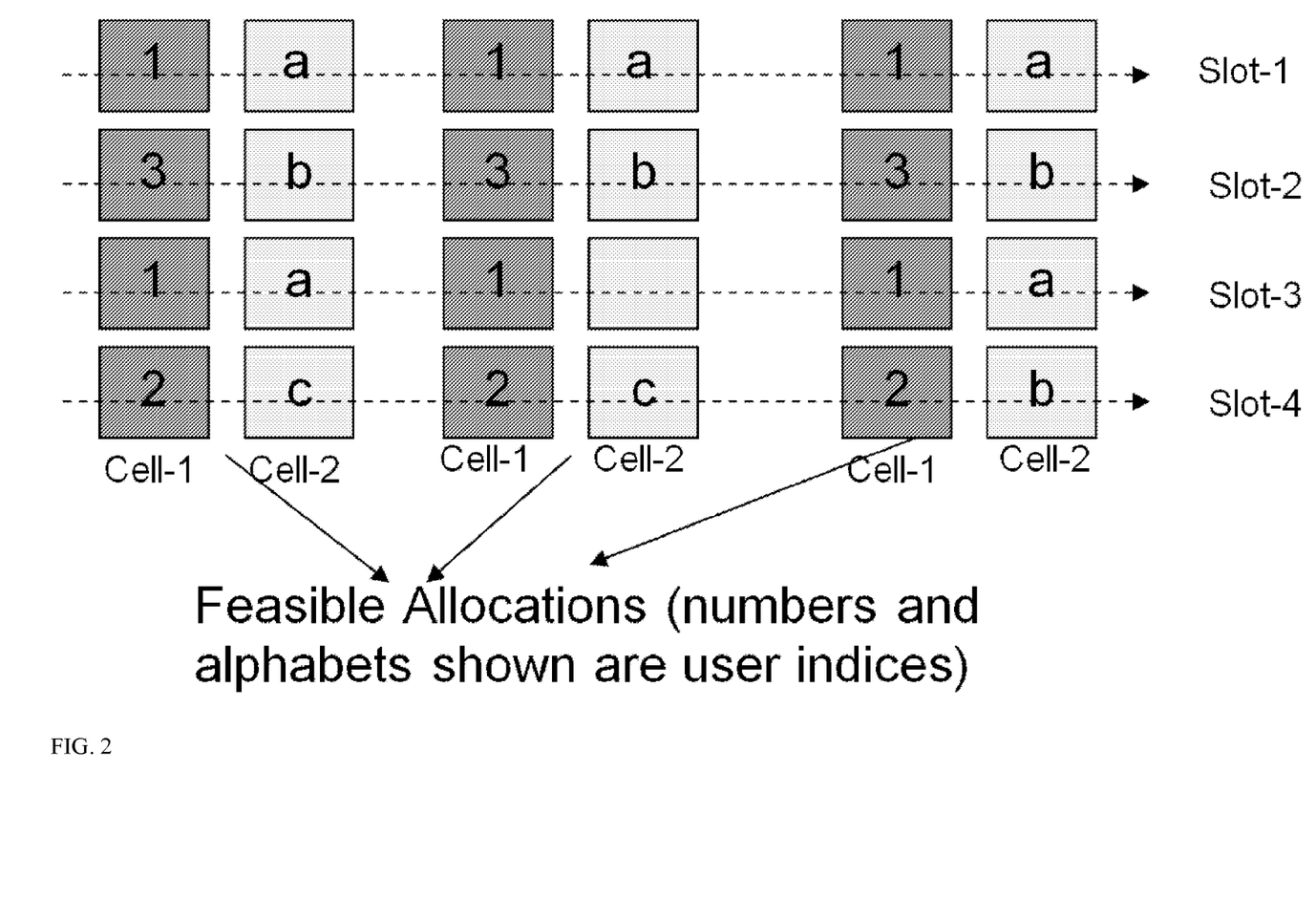
FIGS. 2, 4 and 6 show exemplary scenarios for coordinated resource allocation.
Figure 3:
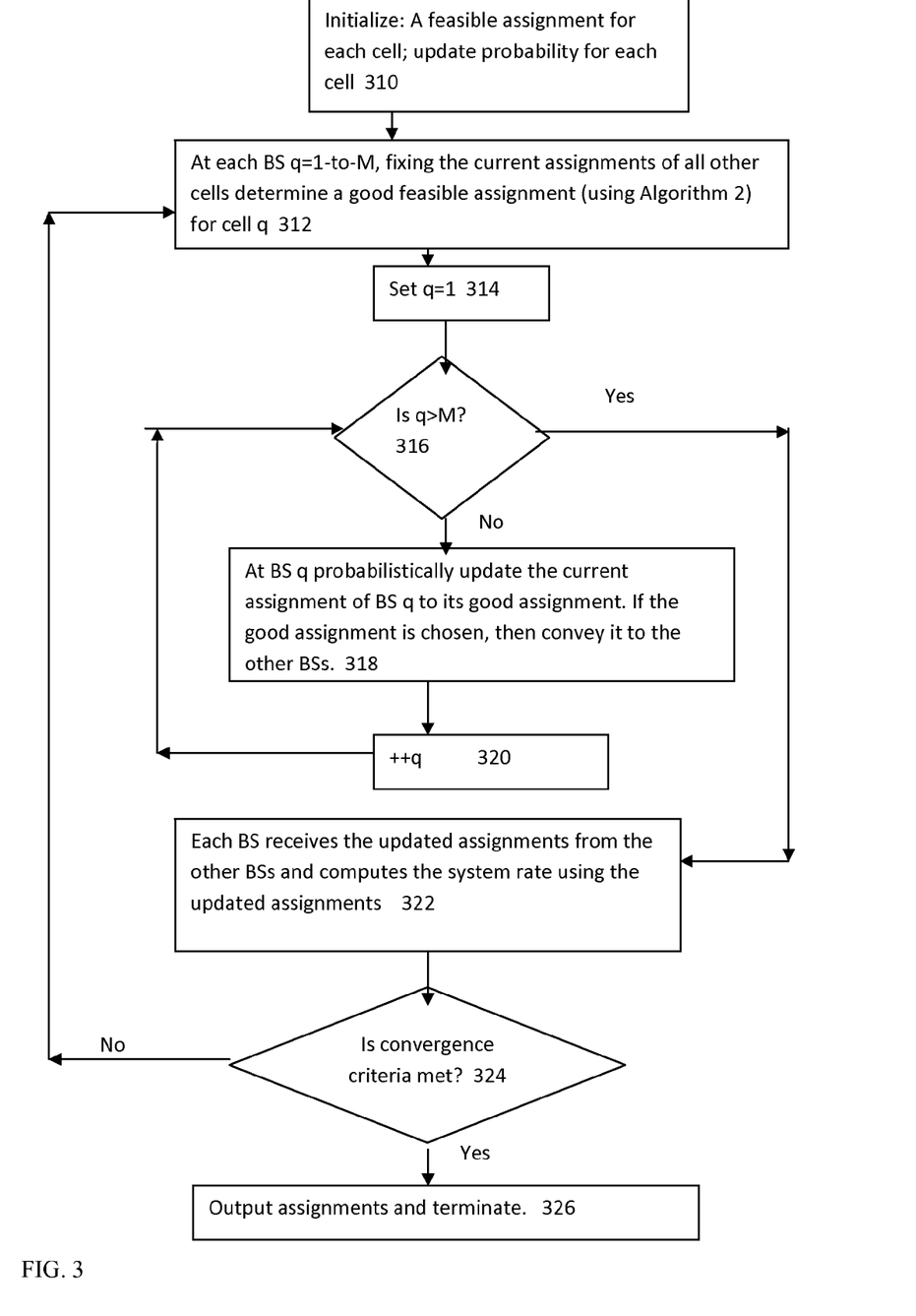
FIG. 3 shows an exemplary process for allocating resources in the scenario of FIG. 2.
Figure 4:
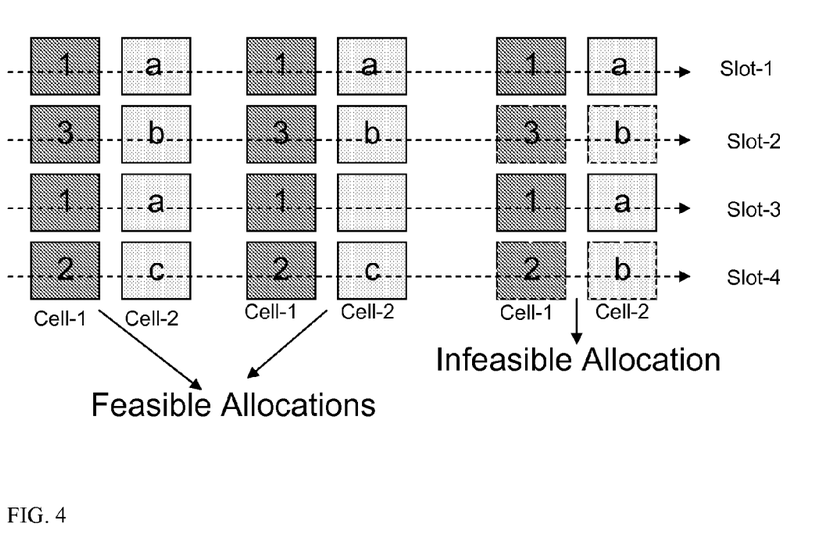
Figure 5:
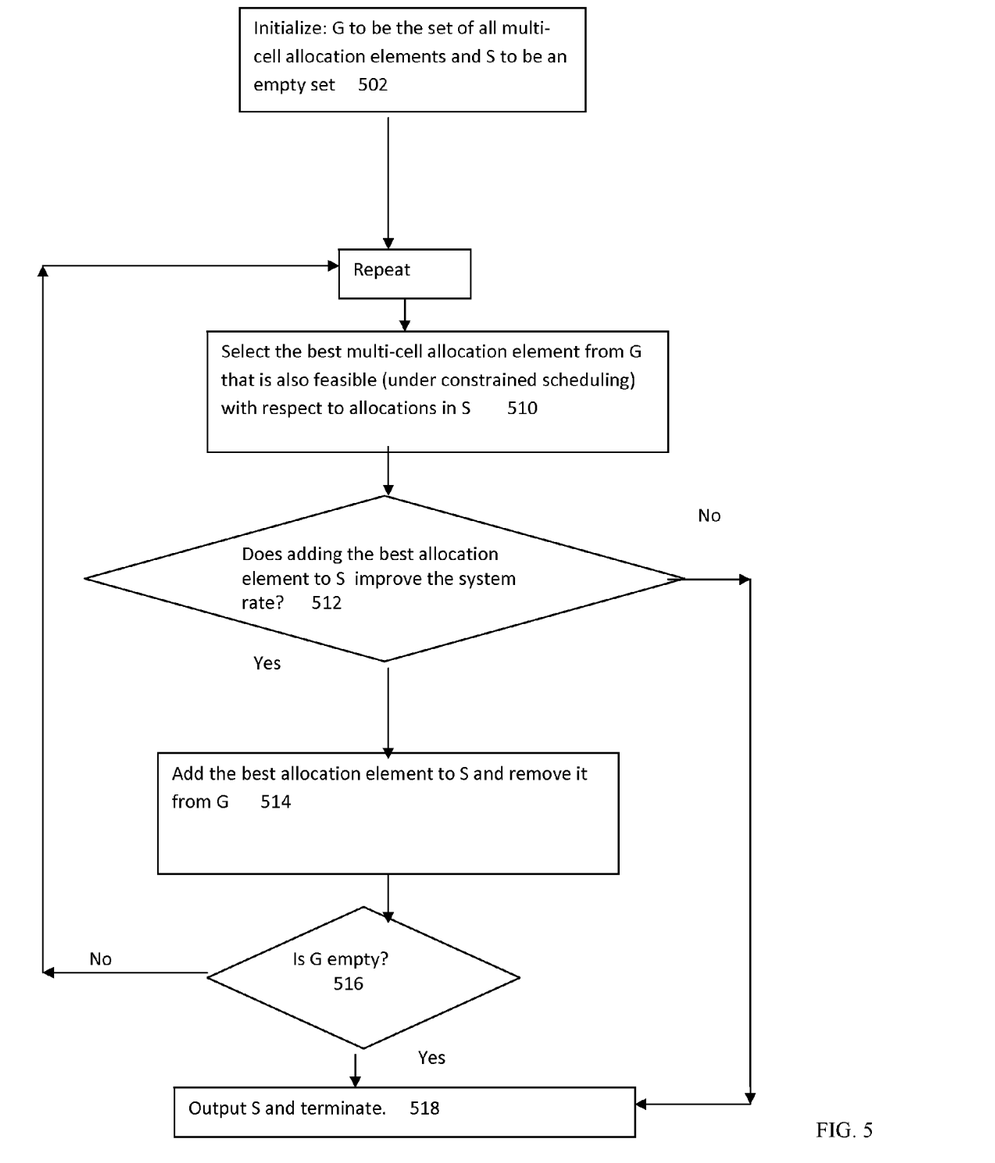
FIG. 5 shows an exemplary process that handles constrained resource allocation in multi-source networks with interference cancellation.
Figure 6:
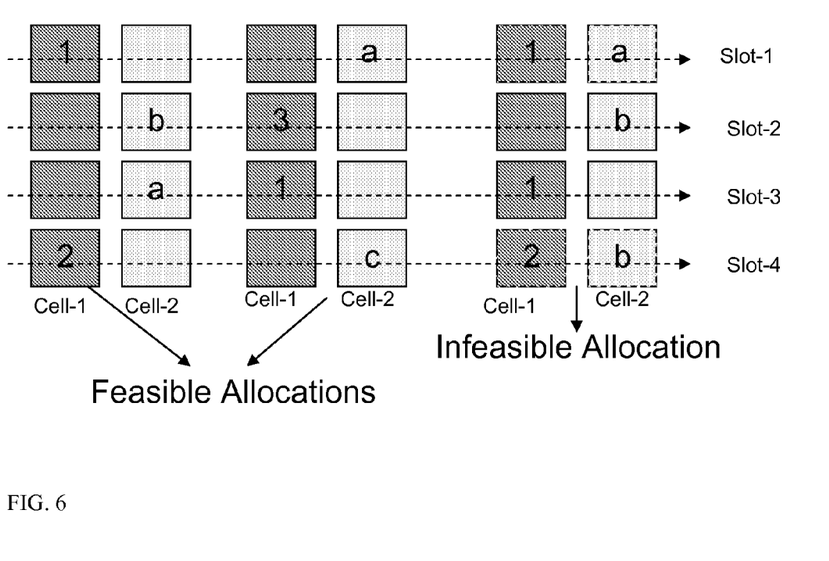

Next, three relevant scenarios are shown in FIGS. 2, 4 and 6 for coordinated resource allocation. The system handles these scenarios efficiently through processes shown in FIGS. 3, 5 and 7.

Turning now to FIG. 2, one exemplary interference suppression condition is shown. In this scenario, resource allocation (Scheduling) under Interference Suppression is handled. Here:

1) Each scheduled user suppresses interference from signals intended for co-slot other cell users via linear filtering 2) Interference covariance can be estimated by a scheduled user without explicit signaling about the interferers.

3) Full scheduling flexibility can be enjoyed since signaling overhead is not a bottleneck.

This examplary arrangement includes a multi-cell downlink comprising of M cells and N orthogonal resource slots that are available in each scheduling interval. In this example for Interference Suppression, M=2 cells (sources), N=4 slots.

FIG. 3 shows an exemplary process for allocating resources in the scenario of FIG. 2. First, during initialization, a feasible assignment is done for each cell and a probability determin parameter is set for each cell (310). Next, at each base station, for each cell q=1 . . . M, the process fixes the current assignment of all other cells to determine a good feasible assignment for a cell q (312).

The process then sets q=1 (314) and then iterates q=1 to q=M as follows. First, the process checks to see if q>M (314). If not, the process probabilistically updates base station q to its good feasible assignment determined in (312). If the good assignment is chosen, the process conveys the assignment to the other base stations (318). Then the process checks the next station (320).

Once all base stations have been checked, each base station receives the updated assignments from the other base stations and determines the system rate using the updated assignments (322). The process then checks convergence criteria (324) and if convergence is not achieved, then the process loops back to (312) to continue processing. Otherwise, the process outputs the base station assignments and exits (326).

Next, an exemplary constrained resource allocation in multi-source networks with interference cancellation is shown in FIG. 4 with M=2 sources, N=4 slots. In this example, scheduled users can now cancel interference from signals intended for co-slot other cell users. The interference cancellation involves decoding the codewords intended for other users.

This can be realized with a reasonable signaling overhead if we impose scheduling restrictions. We now enforce that each scheduled user must see the same set of co-slot other cell users or any subset of those other cell users.

FIG. 5 shows an exemplary process that handles constrained resource allocation in multi-source networks with interference cancellation. During initialization, the process sets G to be the set of all multi cell allocation elements and S to be an empty set (502).

Next, the process iterates from 510-516. In 510, the process selects the best multi-cell allocation element from G that is feasible under constrained scheduling with respect to allocations in S. The process then checks if the system can be improved by adding the best allocation element to S (512). If so, the best allocation element is added to S and that element is removed from G (514). The process checks if G is empty and if not, loops back to 510. If G is empty in 516, or if adding the best allocation element does not improve the system rate in 512, the process outputs S and exits (518).

FIG. 6 shows an exemplary scenario for scheduling under Interference Avoidance. In this case, at-most one user across all M cells can be scheduled on each slot. In this examplary scheduling under Interference Avoidance, M=2 sources, N=4 slots.

Figure 7:
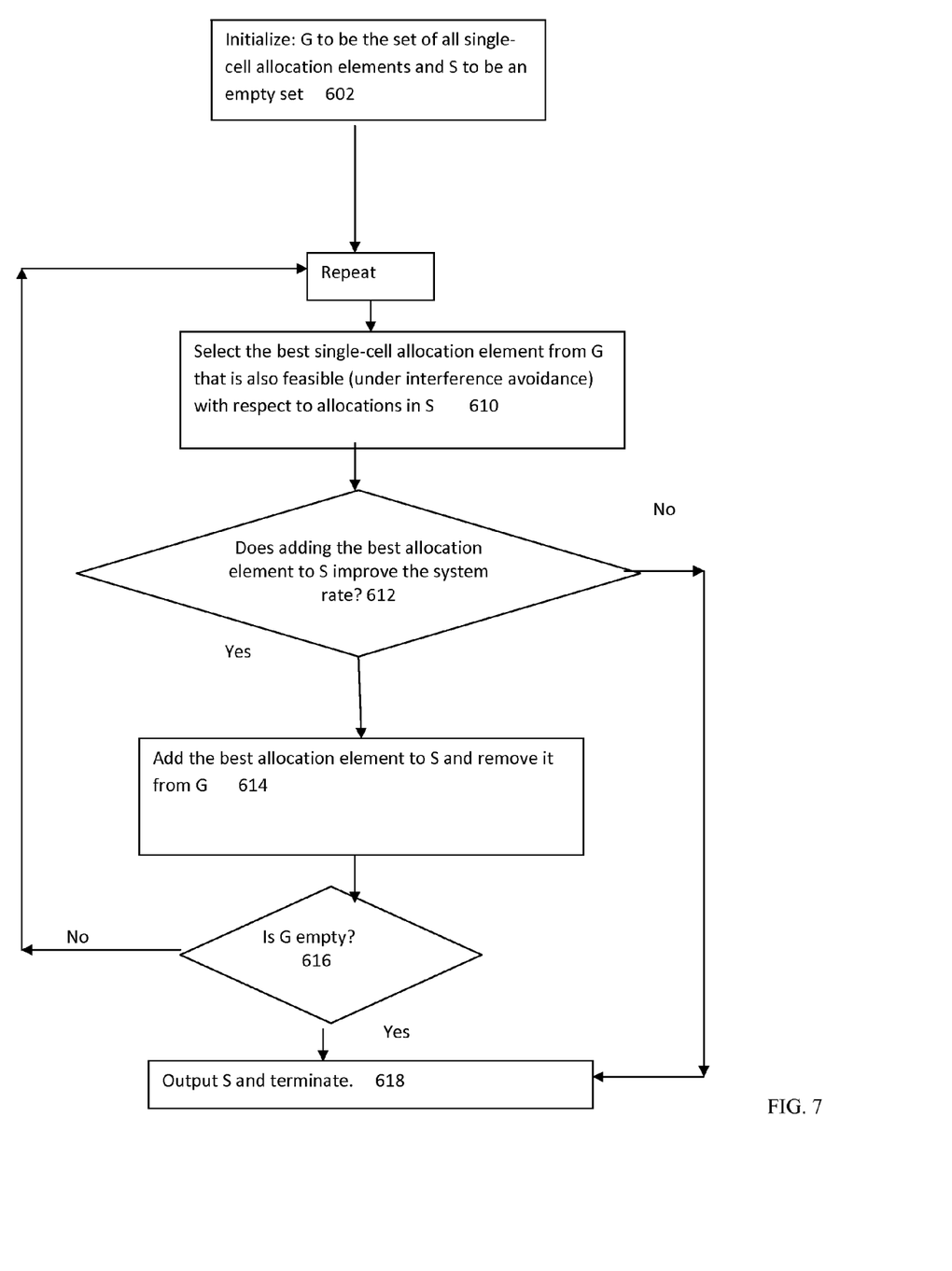
FIG. 7 shows an exemplary process that handles constrained resource allocation in multi-source networks with interference avoidance.

FIG. 7 shows an exemplary process that handles constrained resource allocation in multi-source networks with interference avoidance. During initialization, the process sets G to be the set of all single cell allocation elements and S to be an empty set (602).

Next, the process iterates from 610-616. In 610, the process selects the best single-cell allocation element from G that is feasible under constrained scheduling with respect to allocations in S. The process then checks if the system can be improved by adding the best allocation element to S (612). If so, the best allocation element is added to S and that element is removed from G (614). The process checks if G is empty and if not, loops back to 610. If G is empty in 616, or if adding the best allocation element does not improve the system rate in 612, the process outputs S and exits (618).

We consider a downlink cellular network with universal frequency reuse where a cluster of M coordinated base stations simultaneously transmit on N orthogonal (in the time or frequency or code domain) resource slots during each scheduling interval. Each base station (BS) is equipped with P antennas and serves at-most one multi-antenna user (mobile) on each resource slot. Moreover, each user is served by only its anchor base station and the association of each user to an anchor BS is pre-determined. In addition the coordinated base stations only exchange channel quality related measurements. Let $B_q$ denote the set of users that can be served by the BS q, where q=1, ..., M. Without loss of generality, we assume that each user is identified by a unique index so that $B_{q_1} \cap B_{q_2} = \emptyset$ for $q_1 \neq q_2$. Then, let $B_q(n)$ be the terminal scheduled by base station q on slot n, for q=1, ..., M and n=1, ..., N. An intra-cell orthogonality constraint is imposed, i.e., each BS can schedule at-most one user on each one of the N slots in a scheduling interval so that $|B_q(n)| \leq 1 \forall q,n$. The signal transmitted by base station q on slot n can then be expressed as $$x_q(n) = W_{q,k}(n) b_{q,k}(n) \in \mathbb{C}^P, k \in B_q(n), \quad (1)$$

where $b_{q,k}(n)$ is the complex symbol vector transmitted by base station q on slot n to user $k \in B_q(n)$ using the precoding matrix $W_{q,k}(n)$. We assume that $E[b_{q,k}(n) b_{q,k}^\dagger(n)] = I$, $E[b_{q_1 k_1}(n_1) b_{q_2 k_2}^\dagger(n_2)] = 0$ for $(n_1, q_1, k_1) \neq (n_2, q_2, k_2)$ and that $$tr(W_{q,k}(n) W_{q,k}(n)^\dagger) \leq P_{q,max},$$

where $P_{q,max}$ is the pre-determined maximum per-slot transmit power at base station q. Next, assuming that the maximum propagation delay within the cluster of coordinated base stations is small compared to the inverse of the signal bandwidth, the signal received by user $k \in B_q(n)$ on slot n can be written as $$y_k(n) = \sum_{j=1}^{M} H_{k,j}(n) x_j(n) + z_k(n), \quad (2)$$

where $H_{k,j}(n)$ models the MIMO channel between base station j and user k on slot n (which includes small-scale fading, large-scale fading and path attenuation), while $z_k(n)$ is the additive circularly-symmetric Gaussian noise vector.

Next, for each user k we can define a finite set of formats $\mathcal{F}_k$ which can consist of (constellation(s), precoding rank) pairs or can consist of (constellation(s), precoding matrix) pairs. Thus the practical constraints mentioned before can be enforced by imposing that each scheduled user can be served using any one format drawn from its format set in a scheduling interval. Further, for some channel realizations it may be optimal (with respect to the system utility or system rate) to let only a subset of the M base-stations transmit on a slot. To allow for such a possibility, we insert a dummy user $\theta_q$ in $B$ q, $\forall q$ which can be only served using a dummy format $\zeta_q$. Thus, selecting $(\theta_q, \zeta_q)$ as the (user,format) pair for BS q on a slot means that BS q does not transmit on that slot.

Next, scheduling under Inter-Cell Interference Suppression is discussed. We consider scheduling in the scenario where each scheduled user suppresses the inter-cell interference (caused by co-slot signals intended for users in other cells) via linear filtering. Consequently, a scheduled user does not need to know the constellations and coding rates assigned to the co-scheduled other-cell users and a user can be scheduled with any set of other-cell users on each of its assigned slots. These facts make this scenario one of dominant interest in practical systems.

In order to formulate our optimization problem, we define a set $\Omega$ whose elements are M-tuples of (user, format) pairs, i.e., $$\Omega = \{(\omega^{(1)}, \omega^{(2)}, \ldots, \omega^{(M)}) : \omega^{(q)} = (u, f), u \in B_q, f \in \mathcal{F}_u, \forall 1 \leq q \leq M\}$$

Let $\mathcal{N} = \{1, \ldots, N\}$ denote the set of orthogonal slots. We define a per-slot system utility or rate-function $r: \Omega \times \mathcal{N} \to \mathbb{R}_+$ such that $r((\omega^{(1)}, \omega^{(2)}, \ldots, \omega^{(M)}), n)$ yields the system weighted sum-rate on slot n obtained upon assigning $(\omega^{(1)}, \omega^{(2)}, \ldots, \omega^{(M)}) \in \Omega$ to slot n. While our formulation allows for any general rate-function, the two cases of interest are the following:

The first case is one where each format specifies constellation(s) and a rank. In this case, for any choice $(\omega^{(1)}, \omega^{(2)}, \ldots, \omega^{(M)}) \in \Omega$ the precoding matrices can be designed on a per-slot basis based on the (estimates of) the channel realizations on each slot. Note that for any given $(\omega^{(1)}, \omega^{(2)}, \ldots, \omega^{(M)})$ (which specifies a choice of users and their formats), we have an M user narrowband MIMO Gaussian interference channel (GIFC) wherein all transmission ranks along with the corresponding maximum transmit powers have been specified. Consequently, we can employ any one of several known algorithms for designing precoding matrices, such as the ones: based on interference alignment, maximizing the signal-to-leakage-noise ratio etc. The per-slot system rate can be computed once the precoding matrices have been designed.

The second case is the one where each format specifies constellation(s) and a precoding matrix. In this case an interesting decoupling property holds. From the received signal model in (2) we can deduce that once the precoding matrices used by all BSs on a slot are specified, the rate obtained by scheduling a user in any cell on that slot is invariant to the choice of the other-cell co-slot users. Thus, given a choice of M formats (one for each cell) $f^{(1)}, \ldots, f^{(M)}$ and users $u^{(1)}, \ldots, u^{(M)}$, the system rate on each slot is a sum of M per-cell rates, i.e., letting $\omega^{(q)} = (u^{(q)}, f^{(q)})$, we have that $$r((\omega^{(1)}, \omega^{(2)}, \cdots, \omega^{(M)}), n) = \sum_{q=1}^{M} \tilde{r}(u^{(q)}, f^{(1)}, \cdots, f^{(M)}, n) \quad (3)$$

Let $(\omega^{(q)}, n)$ denote an indicator function which is equal to one when $\omega^{(q)}$ is selected by BS q for slot n and zero otherwise. Define $$\Omega^{(q)} = \{\omega^{(q)} : \omega^{(q)} = (u, f), u \in B_q, f \in \mathcal{F}_u\}$$

so that $\Omega = \Omega^{(1)} \times \Omega^{(2)} \cdots \times \Omega^{(M)}$. Then, we can formulate our optimization problem as in (4).

$$\max_{\substack{\{X(\omega^{(q)}, n)\}: \\ \omega^{(q)} \in \Omega^{(q)}, 1 \leq q \leq M, n \in N\}}} \sum_{(\omega^{(1)}, \omega^{(2)}, \ldots, \omega^{(M)}) \in \Omega} \sum_{n \in N} r((\omega^{(1)}, \omega^{(2)}, \cdots, \omega^{(M)}), n) \quad (4)$$

$$\prod_{q=1}^{M} X(\omega^{(q)}, n)$$

s.t. $\sum_{\omega^{(q)} \in \Omega^{(q)}} X(\omega^{(q)}, n) = 1, \forall n, q; X(\omega^{(q)}, n) \in \{0, 1\},$ $\forall \omega^{(q)} \in \Omega^{(q)}, n, q; \left(\sum_{n=1}^{N} X(\omega_1^{(q)}, n)\right)\left(\sum_{n=1}^{N} X(\omega_2^{(q)}, n)\right) = 0,$ $\forall \omega_1^{(q)}, \omega_2^{(q)} \in \Omega^{(q)}, \forall q: \omega_1^{(q)} = (u, f_1), \omega_2^{(q)} = (u, f_2), f_1 \neq f_2;$ Note that in (4) the first constraint ensures that each BS selects one (user, format) pair for each slot, recall that a BS can remain silent on a slot by selecting the dummy-user and its format for that slot. The second constraint ensures that each scheduled user is assigned only one format. Our first result is that (4) is unlikely to be optimally solved by a low (polynomial) complexity algorithm. It follows upon reducing (4) to two special cases and exploiting their known hardness. The first case considered in is power control over a single slot system (N=1) with one user per-cell (K=1), which is shown to be strongly NP-hard. The other one shown to be NP-hard in is the single-cell (M=1) resource allocation problem in which each scheduled user can be assigned one of two formats across all its assigned slots.

In order to obtain a good heuristic we now discuss Algorithm I which is a randomized algorithm. In each iteration of Algorithm I, each BS assumes that the per-slot (user, format) allocations made by all other BSs remain fixed at their respective values at the end of the previous iteration. The process then tries to optimize the system rate by selecting a (user, format) pair for each slot using a pre-determined sub-routine, under the constraint that each scheduled user is served using only one format. All BSs perform such optimization in parallel and depending on the outcome of its optimization each BS adopts a new allocation for itself with a probability. We offer the following result on the randomized algorithm.

For any arbitrarily fixed choice $p_q \in (0,1)$, $\forall q$, the randomized algorithm converges with probability one. The solution obtained upon convergence is such that no base-station can improve the system utility by invoking its sub-routine after assuming the allocations of other base-stations to be fixed.

A state denotes a particular feasible choice of $(\omega^{(1)}, \omega^{(2)}, \ldots \omega^{(M)}) \in \Omega$ for each slot, where feasibility is satisfied if each scheduled user is assigned only one of its formats on all its allocated slots. Clearly there are a finite number of such states and each state maps to one system rate. Also, given the per-slot (user, format) pair allocations made by all other BSs, each BS determines a preferred tentative state using a pre-defined sub-routine and updates its (user, format) pair allocations with a time-invariant probability, if the preferred tentative state yields a strictly higher system rate. Thus, the sequence of states across iterations of the randomized algorithm forms a time-homogenous Markov chain. Then, let a terminating state denote a state for which none of the M preferred tentative states (one determined by each BS) offers a higher system rate and note that such a state is absorbing (i.e., the probability of leaving this state is zero). The fact that the optimal system rate is bounded above together with the finite number of states is enough to conclude that such terminating states exist. Also, since all $\{p_q\}_{q=1}^M$ lie in the open interval (0,1), there is a strictly positive probability of reaching a terminating state starting from any initial state. Almost sure convergence of the time-homogenous Markov chain to a terminating state follows from this fact.

To obtain a practical randomized algorithm we must specify a low-complexity subroutine. Towards this end, for each BS q we define $\mathcal{I}^{(q)}$ to be a family of subsets of $\Omega^{(q)}$ such that the null set and all singleton subsets (i.e., of cardinality one) of $\Omega^{(q)}$ are elements of $\mathcal{I}^{(q)}$. In addition, any subset $\mathcal{A}^{(q)} \subseteq \Omega^{(q)}$ is an element of $\mathcal{I}^{(q)}$ if and only if any two distinct elements $\omega_1^{(q)}, \omega_2^{(q)} \in \mathcal{A}^{(q)}$, where $\omega_1^{(q)} = (u_1, f_1)$, $\omega_2^{(q)} = (u_2, f_2)$, satisfy $u_1 \neq u_2$.

$\mathcal{I}^{(q)}$ is an independence family and $\mathcal{M}^{(q)} = (\Omega^{(q)}, \mathcal{I}^{(q)})$ is a matroid.

Next, given the allocations of made by all other BSs at the end of the previous iteration, $\{\tilde{\chi}(\omega^{(m)}, n) : \omega^{(m)} \in \Omega^{(m)}, m \neq q, n \in \mathcal{N}\}$, we define a set function $f_q : \Omega^{(q)} \to \mathbb{R}_+$ as $$f_q(A^{(q)}) = \sum_{n \in N} \max_{\omega^{(q)} \in A^{(q)}} \left\{ \sum_{\omega^{(m)} \in \Omega^{(m)}, m \neq q} r((\omega^{(1)}, \omega^{(2)}, \ldots, \omega^{(M)}), n) \left( \prod_{m=1, m \neq q}^{M} \tilde{X}(\omega^{(m)}, n) \right) \right\}, \forall A^{(q)} \subseteq \Omega^{(q)}. \quad (5)$$

A simple greedy sub-routine (referred to as the single-cell greedy sub-routine) is proposed next in Algorithm II. We offer the following result on this choice of the sub-routine.

For any fixed choice of $\{\tilde{\chi}(\omega^{(m)}, n) : \omega^{(m)} \in \Omega^{(m)}, m \neq q, n \in \mathcal{N}\}$, the optimization problem in (17) is NP hard. The single-cell greedy sub-routine yields a constant ½-approximation to (17).

It can be shown that for any given $\{\tilde{\chi}(\omega^{(m)}, n) : \omega^{(m)} \in \Omega^{(m)}, m \neq q, n \in \mathcal{N}\}$, the optimization problem in (17) is equivalent to $$\max_{A^{(q)} \in \mathcal{I}^{(q)}} f_q(A^{(q)}). \quad (6)$$

In addition it can be shown that $f_q(.)$ in (5) is a monotonic sub-modular set function. Invoking Lemma 1 we see that the problem in (6) is a monotonic submodular function maximization problem subject to a matroid constraint. Nemhauser et. al. have shown that a greedy algorithm yields a ½ approximation for any such problem. The proposed sub-routine is the greedy algorithm adapted to the problem at hand.

Next, we consider scheduling in the scenario where all users can exploit inter-cell interference cancellation. In order to enable inter-cell interference cancellation in practical systems, the scheduler should satisfy the additional constraint that on all its assigned slots, each user is scheduled with the same set of other-cell users. This constraint allows each scheduled user to be informed about the modulations and coding rates assigned to its co-slot other cell users with a reasonable signaling overhead. Thus, while inter-cell interference cancellation can enable a higher system rate, the accompanying scheduling restriction can degrade these gains. We emphasize that any scheduling decision that satisfies the aforementioned constraint is also conducive to interference alignment. This is due to the fact that the scheduled users can now be divided into multiple groups, where each group represents a choice of users (one for each cell). Notice further that the set of slots can also be partitioned across these groups. Consequently, since each user in a group is also assigned one rank, we have a wideband GIFC model for each group, wherein the rank for each user is specified. Thus, we can design wideband precoders that can achieve much better alignment and higher degrees of freedom compared to per slot (constant channel) precoder designs.

The optimization problem can now be formulated as in (7).

$$\max_{\substack{\{X(\omega^{(q)}, n)\} \\ \omega^{(q)} \in \Omega^{(q)}, 1 \leq q \leq M, n \in N}} \sum_{(\omega^{(1)}, \omega^{(2)}, \ldots, \omega^{(M)}) \in \Omega} \sum_{n \in N} r((\omega^{(1)}, \omega^{(2)}, \ldots, \omega^{(M)}), n)$$

$$\prod_{q=1}^{M} X(\omega^{(q)}, n)$$

-continued $$s.t. \sum_{\omega^{(q)} \in \Omega^{(q)}} X(\omega^{(q)}, n) = 1, \forall n, q; X(\omega^{(q)}, n) \in \{0, 1\}, \forall \omega^{(q)} \in \Omega^{(q)},$$

$$n, q; \left(\sum_{n=1}^{N} \prod_{q=1}^{M} X(\omega_1^{(q)}, n)\right)\left(\sum_{n=1}^{N} \prod_{q=1}^{M} X(\omega_2^{(q)}, n)\right) = 0,$$

$$\forall (\omega_1^{(1)}, \omega_1^{(2)}, \cdots, \omega_1^{(M)}) \neq (\omega_2^{(1)}, \omega_2^{(2)}, \cdots, \omega_2^{(M)}) \in \Omega \text{ if } \exists q \text{ s.t. } \omega_1^{(q)} =$$

$$(u, f_1), \omega_2^{(q)} = (u, f_2) \& u \neq v_q;$$

Note that the rate function $r((\omega^{(1)}, \omega^{(2)}, \ldots, \omega^{(M)}), n)$ now yields the per-slot system rate under interference cancellation. We now proceed to re-formulate (7). To do so, we define a set $\epsilon(u)$ for each user u in the system. Recall that each user index is unique. In particular, for each user $u \in B_q$, we define a set $\epsilon(u) \subseteq \Omega$ as $$\epsilon(u) = \{(\omega^{(1)}, \omega^{(2)}, \ldots, \omega^{(M)}) \in \Omega : \omega^{(q)} = (u, f), f \in \mathcal{F}_u\}$$

so that $\Omega = \cup_{u \in B_q} \epsilon(u), \forall q$. Then, we define a family of sets $\mathcal{P}^{(q)}$ $$\mathcal{A} \in \mathcal{P}^{(q)} \Leftrightarrow \subseteq \Omega : \mathcal{A} \cap \epsilon(u) | \leq 1, \forall u \in B, u \neq \theta_q \quad (8)$$

$\mathcal{P}^{(q)}$ is an independence family and $(\Omega, \mathcal{P}^{(q)})$ is a partition matroid. The set $\cap_{q=1}^{M} \mathcal{P}^{(q)}$ is a p-system with p=M. Defining a set function $f:\Omega \to \mathbb{R}_+$ such that for $\forall \mathcal{A} \subseteq \Omega$ $$f(A) = \sum_{n \in N} \max_{(\omega^{(1)}, \omega^{(2)}, \ldots, \omega^{(M)}) \in A} r((\omega^{(1)}, \omega^{(2)}, \ldots, \omega^{(M)}), n), \quad (9)$$

we can re-formulate the optimization problem in (7) as $$\max_{A \in \cap_{q=1}^{M} \mathcal{P}^{(q)}} f(A). \quad (10)$$

With this re-formulation in hand, we propose the multi-cell greedy algorithm in Algorithm III to sub-optimally solve (10). This algorithm has the following property: For any fixed $K \geq 1$ and $N \geq 1$, the optimization problem in (7) is strongly NP hard. For any fixed $M \geq 1$, the optimization problem in (7) is NP hard. The multi-cell greedy algorithm yields a constant $$\frac{1}{M+1}$$

-approximation to (7).

An additional scheduling flexibility can also be incorporated at the expense of more complexity, by modifying the rate-function and using it in the multi-cell greedy algorithm. In particular, we can consider a more relaxed scheduling restriction that on all its assigned slots, each user is scheduled with the same set of other-cell users or any subset of those other-cell users. To accommodate this relaxed constraint, for any choice of $(\omega^{(1)}, \ldots, \omega^{(M)})$ on a slot n, the rate function $r((\omega^{(1)}, \ldots, \omega^{(M)}), n)$ can be computed as the maximum per-slot system rate that can be obtained by allowing any subset $\mathcal{M} \subseteq \{1, \ldots, M\}$ of the BSs to transmit to their respective chosen users using the selected formats while the remaining BSs are silent. Clearly, computing such a rate-function incurs more complexity. However, with such a rate function there is no need to include a dummy user $\theta_q$ in $B_q$ in any cell q.

We next consider an important special case which arises when a scheduled user can only be served using a precoding matrix drawn from a finite set. We assume that the per-slot system rate satisfies (3). We will show that in this case the sub-problem in (20) permits another reformulation. Towards this end, we define a super-set of formats as $\mathcal{F} = \cup_{q=1}^{M} \cup_{u \in B_q} \mathcal{F}_u$ and note that if a user $u^{(q)} \in B_q$ cannot employ a particular format $f^{(q)} \in \mathcal{F}$, we can always set $\tilde{r}(u^{(q)}, f^{(1)}, \ldots, f^{(q)}, \ldots, f^{(M)}, n)$ to be a large negative number for all n, so that the incompatible (user, format) pair will never be selected. Then, observe that (20) now simplifies to $$\max_{(\omega^{(1)}, \ldots, \omega^{(M)}) \in u: S \cup (\omega^{(1)}, \ldots, \omega^{(M)}) \in \cap_{q=1}^{M} P^{(q)}} \sum_{n} \max \quad (11)$$

$$\left\{v_n, \sum_{q=1}^{M} \tilde{r}(u^{(q)}, f^{(1)}, \ldots, f^{(M)}, n)\right\},$$

where $$v_n = \max_{(\omega^{(1)}, \omega^{(2)}, \ldots, \omega^{(M)}) \in S} r((\omega^{(1)}, \omega^{(2)}, \ldots, \omega^{(M)}), n)$$

$$= \max_{(\omega^{(1)}, \omega^{(2)}, \ldots, \omega^{(M)}) \in S} \sum_{q=1}^{M} \tilde{r}(u^{(q)}, f^{(1)}, \ldots, f^{(M)}, n).$$

Now suppose that we are given any set $\mathcal{S} \in \cap_{q=1}^{M} \mathcal{P}^{(q)}$ that is not maximal, i.e., $$\left\{(\omega^{(1)}, \ldots, \omega^{(M)}) \in \Omega \setminus S : S \cup (\omega^{(1)}, \ldots, \omega^{(M)}) \in \cap_{q=1}^{M} P^{(q)}\right\} \neq \phi,$$

ong with corresponding coefficients $\{v_n\}_{n \in \mathcal{N}}$. We extract the sets $\mathcal{U}^{(q)}$ for q=1, ..., M from $\mathcal{I}$ such that $\mathcal{U}^{(q)}$ consists of the non-dummy users that have been selected in $\mathcal{I}$ for cell q. Furthermore, we define a set function $h_{\mathcal{I}} : \mathcal{N} \to \mathbb{R}_+$ as $$h_S(T) = \sum_{n \in T} u_n + \quad (12)$$

$$\max_{f^{(1)}, \ldots, f^{(M)} \in F} \sum_{q=1}^{M} \max_{u^{(q)} \in B_q \setminus u^{(q)}} \sum_{n \in N \setminus T} \tilde{r}(u^{(q)}, f^{(1)}, \ldots, f^{(M)}, n), \forall T \subseteq$$

$$N.$$

For any given set $\mathcal{I} \in \cap_{q=1}^{M} \mathcal{P}^{(q)}$ that is not maximal in $\mathcal{P}^{(q)}$, the maximization problem in (20) can be re-formulated as the following un-constrained maximization problem:

$$\max_{T \subseteq N} h_S(T). \quad (13)$$

The set function $h_{\mathcal{I}}(.)$ is not monotonic and unfortunately need not be submodular. In this context we note that an efficient local search method for un-constrained maximization of a non-monotonic albeit submodular function is available which offers a constant approximation.

Thus, the step (20) in the multi-cell greedy algorithm can be solved using the lower complexity alternative from the two equivalent formulations in (11) and (13), which in turn depends on the system parameters such as K, M & N.

Next, we consider an interference limited environment over which interference avoidance is a useful approach. In particular, on each slot only one BS is allowed to transmit. To formulate the resulting resource allocation problem, we define a superset of (user, format) pairs $\tilde{\Omega} = \cup_{q=1}^{M} \Omega^{(q)}$. Then let $r_{su}(\omega^{(q)}, n)$ denote the rate obtained on slot n when only the (user, format) pair in $\omega^{(q)}$ is scheduled and all BSs other than q remain silent. The corresponding optimization problem can now be formulated as $$\max_{\substack{\{X(\omega^{(q)},n)X(\omega^{(q)},n)\in\{0,1\} \\ \omega^{(q)}\in\Omega^{(q)},1\leq n\leq M, n\in N\}}} \sum_{n\in N} \max_{1\leq q\leq M} \left\{ \sum_{\omega^{(q)}\in\Omega^{(q)}} r_{su}(\omega^{(q)},n)X(\omega^{(q)},n) \right\} \quad (14)$$

$$s.t. \sum_{\omega^{(q)}\in\Omega^{(q)}} X(\omega^{(q)},n) = 1, \forall n, q;$$

$$\left(\sum_{n=1}^{N} X(\omega_1^{(q)},n)\right)\left(\sum_{n=1}^{N} X(\omega_2^{(q)},n)\right) = 0, \forall \omega_1^{(q)},$$

$$\omega_2^{(q)} \in \Omega^{(q)} : \omega_1^{(q)} = (u_1, f_1), \omega_2^{(q)} = (u_2, f_2) \& u_1 \neq u_2, \forall q;$$

We next define another family of subsets of $\tilde{\Omega}$ as $\mathcal{I} = \{\cup_{q=1}^{M} \mathcal{A}_q : \mathcal{A}_q \in \mathcal{I}^{(q)}, \forall q\}$. A key property is the fact that the union of matroids is also a matroid.

Next, consider the set function $\tilde{f}: \tilde{\Omega} \to \mathbb{R}_+$ defined as $$\tilde{f}(A) = \sum_{n\in N} \max_{\omega^{(q)}\in A} \{r_{su}(\omega^{(q)},n)\}, \forall A \subseteq \tilde{\Omega}. \quad (15)$$

Then, the resource allocation problem in (14) can be equivalently formulated as $$\max_{A\in\tilde{I}} \{\tilde{f}(A)\} \quad (16)$$

In Algorithm IV, we propose a simple greedy method for scheduling under interference avoidance and offer the following result.

The optimization problem in (16) is NP hard. Algorithm IV yields a constant ½-approximation to (16). In addition, it also yields a constant $$\frac{1}{2M}$$

-approximation to (4) as well as (7).

The optimization problem in (16) is that of maximizing a monotonic sub-modular set function subject to a matroid constraint. Thus, a simple greedy algorithm (adapted as Algorithm IV) yields a ½ approximation. Also, since $r((\omega^{(1)}, \omega^{(2)}, \ldots, \omega^{(M)}), n) \leq M_{\max_{q=1,\ldots,M}} \{r_{su}(\omega^{(q)},n)\}$, we can show that the solution yielded by the greedy algorithm offers a system utility that is no less than $$\frac{1}{2M}$$

of the optimal value obtained by solving (4). Further, the remaining part is also true since the solution yielded by Algorithm IV is also feasible for (7).

$$\max_{\{x(\omega^{(q)},n),\omega^{(q)}\in\Omega^{(q)},n\in N\}} \sum_{(\omega^{(q)},\omega^{(1)},\ldots,\omega^{(M)})\in\Omega} \sum_{n\in N} \quad (17)$$

$$r((\omega^{(1)}, \omega^{(2)}, \cdots, \omega^{(M)}), n)$$

$$\left(\prod_{m=1,m\neq q}^{M} \ddot{X}(\omega^{(m)},n)\right) X(\omega^{(q)},n)$$

$$s.t. \left(\sum_{n=1}^{N} X(\omega_1^{(q)},n)\right)\left(\sum_{n=1}^{N} X(\omega_2^{(q)},n)\right) = 0, \forall \omega_1^{(q)},$$

$$\omega_2^{(q)} \in \Omega^{(q)} : \omega_1^{(q)} = (u, f_1), \omega_2^{(q)} = (u, f_2), f_1 \neq f_2;$$

$$\sum_{\omega^{(q)}\in\Omega^{(q)}} X(\omega^{(q)},n) = 1, \forall n; X(\omega^{(q)},n) \in \{0,1\}, \forall \omega^{(q)} \in \Omega^{(q)}, n;$$

[Algorithm I: Randomized Algorithm]

1. Initialize with any feasible assignment $\{(\omega^{(q)},n)\}$, $\omega^{(q)} \in \Omega^{(q)}$, $1 \leq q \leq M$, $n \in N\}$ and let $\tilde{R}$ denote the corresponding system rate.

2. REPEAT

3. At each BS q, assuming $\{\tilde{\chi}(\omega^{(m)},n) : \omega^{(m)} \in \Omega^{(m)}, m \neq q, n \in \mathcal{N}\}$ to be fixed, (sub-optimally) solve the optimization problem in (17) using a pre-determined sub-routine and let $\{\tilde{\chi}(\omega^{(q)},n)\}$, $\hat{R}_q$ denote the obtained solution and the corresponding objective function value.

4. If $\hat{R}_q > \tilde{R}$ then with probability $p_q$ update all $\{\tilde{\chi}(\omega^{(q)},n))$, $\omega^{(q)} \in \Omega^{(q)}$, $n \in \mathcal{N}\}$ to $\{\hat{\chi}(\omega^{(q)},n))$, $\omega^{(q)} \in \Omega^{(q)}$, $n \in N\}$ and inform other base stations $m \neq q$ about the update.

5. Collect updates from other base stations if any.

6. UNTIL $\hat{R}_q = \tilde{R}, \forall q$

7. OUTPUT $\{(\omega^{(q)},n)\}, \omega^{(q)} \in \Omega^{(q)}, 1 \leq q \leq M, n \in N\}$.

[Algorithm II: Single-Cell Greedy Sub-Routine]

1. Initialize $G^{(q)} = \Omega^{(q)}, S^{(q)} = \phi$

2. REPEAT

3. Solve $$\max_{\omega^{(q)}\in G^{(q)}: S^{(q)}\cup\omega^{(q)}\in T^{(q)}} f_q(S^{(q)} \cup \omega^{(q)}) \quad (18)$$

and let $\hat{\omega}^{(q)}, \hat{v}^{(q)}$ denote the optimal solution and the optimal objective function value.

4. If $\hat{v}^{(q)} > f_q(^{(q)})$ then update $$S^{(q)} \to S^{(q)} \omega^{(q)}, g^{(q)} \to g^{(q)} \setminus \omega^{(q)} \quad (19)$$

5. UNTIL $\{\omega^{(q)} \in g^{(q)} : \mathcal{I}^{(q)} \cup \omega^{(q)} \in \mathcal{I}^{(q)}\} = \phi$ or $\delta^{(q)} = f_q(\mathcal{I}^{(q)})$ 6. For each n∈N determine $\hat{\omega}^{(q)}$ as $$\arg\max_{\omega^{(q)}\in G^{(q)}} \sum_{\omega^{(q)}\in\Omega^{(q)}_{\omega,n}} r((\omega^{(1)}, \omega^{(2)}, \cdots, \omega^{(M)}), n)\left(\prod_{m=1,m\neq q}^{M} \hat{X}(\omega^{(m)}, n)\right)$$

and set $\chi(\hat{\omega}^{(q)},n)=1$ and $\chi(\omega^{(q)},n)=0$, $\forall \omega^{(q)}\neq\hat{\omega}^{(q)}$.

[Algorithm III: Multi-Cell Greedy Algorithm]
1. Initialize. $g=\Omega, \delta=\phi$
2. REPEAT
3. Solve $$\max_{\substack{\omega^{(1)},\ldots,\omega^{(M)}\in N \\ x\cup(\omega^{(1)},\ldots,\omega^{(M)})_{n\in N_{q=1}^M} \underline{X}^{(q)}}} f(S\cup(\omega^{(1)},\cdots,\omega^{(M)})) \quad (20)$$

and let $(\hat{\omega}^{(1)},\ldots,\hat{\omega}^{(M)})$, $\hat{v}$ denote the optimal solution and the optimal objective function value.

4. If $\hat{v} > \hat{f}(S)$ then update
$S \to S \cup (\hat{\omega}^{(1)},\ldots,\hat{\omega}^{(M)}), g \to g\backslash(\hat{\omega}^{(1)},\ldots,\hat{\omega}^{(M)}),$ 5. UNTIL $\{(\omega^{(1)},\ldots,\omega^{(M)})\in g: s\cup(\omega^{(1)},\ldots,\omega^{(M)})\in \cap_{q=1}^{M} \mathcal{P}^{(q)}\}=\phi$ or $\hat{v}=\hat{f}(S)$
6. OUTPUT

[Algorithm IV: Greedy Algorithm for Interference Avoidance]
1. Initialize $g=\Omega, s=\phi$
2. REPEAT
3. Solve $$\max_{\omega^{(q)}\in G, s\cup\omega^{(q)}\in \underline{X}} \tilde{f}(S\cup\omega^{(q)}) \quad (21)$$

and let $\hat{\omega}^{(q)}$, $\hat{v}$ denote the optimal solution and the optimal objective function value.

4. If $\hat{v} > \hat{f}(S)$ then update
$s \to s\cup\omega^{(q)}, g \to g\backslash\omega^{(q)},$ (22)

5. UNTIL $(\omega^{(q)}\in g: s\cup\omega^{(q)}\in \mathcal{I}=\phi$ or $\hat{v}=\hat{f}(S)$
6. OUTPUT Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

What is claimed is:

1. A method to allocate resources in a wireless system to optimize communication between a set of sources and a plurality of mobile wireless devices over a plurality of orthogonal resource slots, comprising: enforcing each source to transmit to at-most one device over each orthogonal slot; enforcing the number of data streams transmitted by a source to a device is identical on all slots on which the source transmits to the device; optimizing a metric responsive to the assignment of resource: slots to mobile devices by each source: in the set, said optimizing including approximately maximizing a monotonic sub-modular function under a matroid constraint.

2. The method of claim 1, comprising allocating resources assuming interference suppression at each scheduled device.

3. The method of claim 2, wherein each scheduled device suppresses interference from signals intended for co-slot devices served by other sources, with linear filtering.

4. The method of claim 2, comprising, estimating interference covariance at a scheduled device without explicit signaling about the co-slot interference.

5. The method of claim 2, comprising determining a feasible assignment of resource slots to devices for a predetermined source.

6. The method of claim 5, comprising probabilistically updating a current assignment of a source to a good assignment and notifying other sources if the good assignment is taken.

7. The method of claim 6, comprising checking for convergence.

8. The method of claim 1, comprising allocating resources assuming interference cancellation by each scheduled device.

9. The method of claim 8, comprising decoding the codewords intended for other devices.

10. The method of claim 8, wherein scheduled devices cancel interference from signals intended for co-slot devices served by other sources.

11. The method of claim 8, comprising imposing scheduling restrictions to minimize signaling overhead.

12. The method of claim 8, comprising enforcing that each scheduled device sees the same set of co-slot devices served by other sources or any subset of those devices.

13. The method of claim 8, comprising selecting the best multi-cell allocation element that is feasible under constrained scheduling given a set of selected multi-cell allocation elements and adding the best multi-cell allocation element to the set of selected multi-cell allocation elements.

14. The method of claim 1, comprising allocating resources under interference avoidance.

15. The method of claim 14, wherein only one device across all M cells is scheduled on each slot.

16. The method of claim 14, comprising selecting the best allocation element that is feasible under constrained scheduling given a set of selected allocation elements and adding the best allocation element to the set of selected allocation elements.

17. A method to allocate resources in a wireless system to optimize communication between a set of sources and a plurality of mobile wireless devices over a plurality of orthogonal resource slots, comprising:

enforcing each source to transmit to at-most one device over each orthogonal slot;

enforcing the number of data streams transmitted by a source to a device is identical on all slots on which the source transmits to the device;

optimizing a metric responsive to the assignment of resource slots to mobile devices by each source in the set; and employing the following optimization problem:

$$\max_{\substack{\{X(\omega^{(q)},n)\colon \\ \omega^{(q)} \in \Omega^{(q)}, 1 \leq q \leq M, n \in N\}}} \sum_{(\omega^{(1)},\omega^{(2)},\ldots,\omega^{(M)}) \in \Omega} \sum_{n \in N} r((\omega^{(1)}, \omega^{(2)}, \ldots, \omega^{(M)}), n)$$

$$\prod_{q=1}^{M} X(\omega^{(q)}, n)$$

$$s.t. \sum_{\omega^{(q)} \in \Omega^{(q)}} X(\omega^{(q)}, n) = 1, \forall n, q; X(\omega^{(q)}, n) \in \{0, 1\}, \forall \omega^{(q)} \in \Omega^{(q)},$$

$$n, q; \left(\sum_{n=1}^{N} X(\omega_1^{(q)}, n)\right)\left(\sum_{n=1}^{N} X(\omega_2^{(q)}, n)\right) = 0, \forall \omega_1^{(q)},$$

$$\omega_2^{(q)} \in \Omega^{(q)}, \forall q\colon \omega_1^{(q)} = (u, f_1), \omega_2^{(q)} = (u, f_2), f_1 \neq f_2;$$

where $\omega^{(q)}$ denotes a choice of device and transmission format at cell q; M denotes the number of cells, N denotes the number of slots, $\Omega^{(q)}$ denotes the set of all possible such choices at cell q; $r((\omega^{(1)}, \omega^{(2)}, \ldots, \omega^{(M)}),n)$ is the weighted sum rate obtained for the corresponding M choices of devices and their transmission formats on slot n when interference suppression is employed at each device, $\chi(\omega^{(q)}, n)$ is an indicator function that returns a value of one if the choice of device and transmission format denoted by $\omega^{(q)}$ is selected by cell q on slot n and zero otherwise; u denotes a device; $f_1, f_2$ denote transmission formats.

18. A method to allocate resources in a wireless system to optimize communication between a set of sources and a plurality of mobile wireless devices over a plurality of orthogonal resource slots, comprising:

enforcing each source to transmit to at-most one device over each orthogonal slot;

enforcing the number of data streams transmitted by a source to a device is identical on all slots on which the source transmits to the device;

optimizing a metric responsive to the assignment of resource slots to mobile devices by each source in the set; and employing the following optimization problem:

$$\max_{\substack{\{X(\omega^{(q)},n)\} \\ \omega^{(q)} \in \Omega^{(q)}, 1 \leq n \leq M, n \in N}} \sum_{(\omega^{(1)},\omega^{(2)},\cdots,\omega^{(M)}) \in \Omega} \sum_{n \in N} r((\omega^{(1)}, \omega^{(2)}, \cdots, \omega^{(M)}), n)$$

$$s.t. \sum_{\omega^{(q)} \in \Omega^{(q)}} X(\omega^{(q)}, n) = 1, \forall n, q; X(\omega^{(q)}, n) \in \{0, 1\}, \forall \omega^{(q)} \in \Omega^{(q)},$$

$$n, q; \left( \sum_{n=1}^{N} \prod_{q=1}^{M} X(\omega_1^{(q)}, n) \right) \left( \sum_{n=1}^{N} \prod_{q=1}^{M} X(\omega_2^{(q)}, n) \right) = 0,$$

$$\forall (\omega_1^{(1)}, \omega_1^{(2)}, \cdots, \omega_1^{(M)}) \neq (\omega_2^{(1)}, \omega_2^{(2)}, \cdots, \omega_2^{(M)}) \in \Omega \text{ if } \exists \ q \ s.t. \ \omega_1^{(q)} = (u, f_1), \omega_2^{(q)} = (u, f_2) \ \& \ u \neq v_q;$$

where $\omega^{(q)}$ denotes a choke of device and transmission format at cell q; M denotes the number of cells, N denotes the number of slots, $\Omega^{(q)}$ denotes the set of all possible such choices at cell q; $r((\omega^{(1)}, \omega^{(2)}, \ldots, \omega^{(M)}), n)$ is the weighted sum rate obtained for the corresponding M choices of devices and their transmission formats on slot n when interference cancellation is employed at each device, $\chi(\omega^{(q)}, n)$ is an indicator function that returns a value of one if the choice of device and transmission format denoted h $\omega^{(q)}$ is selected by cell q on slot n and zero otherwise, u denotes a device; $f_1, f_2$ denote transmission formats.

* * * * *